(12) United States Patent
Rivera

(10) Patent No.: US 11,576,516 B2
(45) Date of Patent: *Feb. 14, 2023

(54) BEVERAGE BREWING DEVICE

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 588 days.

This patent is subject to a terminal disclaimer.

(21) Appl. No.: 16/531,033

(22) Filed: Aug. 3, 2019

(65) Prior Publication Data

US 2021/0030193 A1 Feb. 4, 2021

(51) Int. Cl.
*A47J 31/20* (2006.01)
*A47J 31/06* (2006.01)
*A47J 31/40* (2006.01)
*A47J 31/00* (2006.01)

(52) U.S. Cl.
CPC .......... *A47J 31/20* (2013.01); *A47J 31/0636* (2013.01); *A47J 31/407* (2013.01); *A47J 31/005* (2013.01)

(58) Field of Classification Search
CPC ...... A47J 31/005; A47J 31/0626; A47J 31/18; A47J 31/20; A47J 43/046; A47J 31/0636
USPC .................................................. 99/322, 323
See application file for complete search history.

(56) References Cited

U.S. PATENT DOCUMENTS

| 2,858,762 | A  | * | 11/1958 | Wade ...................... | A47J 31/20 99/302 C |
| 9,713,399 | B2 | * | 7/2017 | Boone ................... | A47J 43/046 |
| 2007/0056447 | A1 | * | 3/2007 | Swartz ................ | A47J 43/1031 99/287 |
| 2013/0118358 | A1 | * | 5/2013 | Lown ...................... | A47J 31/20 99/279 |
| 2015/0157049 | A1 | * | 6/2015 | Fogelin ................ | B01D 33/015 210/396 |
| 2018/0242775 | A1 | * | 8/2018 | Lin ...................... | A47J 31/0636 |
| 2019/0059412 | A1 | * | 2/2019 | Jacobs ................ | A47J 31/5253 |

* cited by examiner

*Primary Examiner* — Reginald Alexander
(74) *Attorney, Agent, or Firm* — IP Strategies

(57) ABSTRACT

A beverage brewing device reduces the time required to produce a cold-brewed beverage. The brewer includes a container and a brewing material holder configured to be suspended from a lid of the container. The brewing material holder includes at least a mesh panel and is configured to support and contain brewing material in the brewing material holder. The lid assembly includes a mechanism configured to rotate the brewing material holder with respect to the lid about an axis extending away from the lid. The container is filled with water and the brewing material holder is filled with brewing material and submerged in the water within the container. Movement of the brewing material submerged in water substantially reduces the time required for cold brewing.

30 Claims, 13 Drawing Sheets

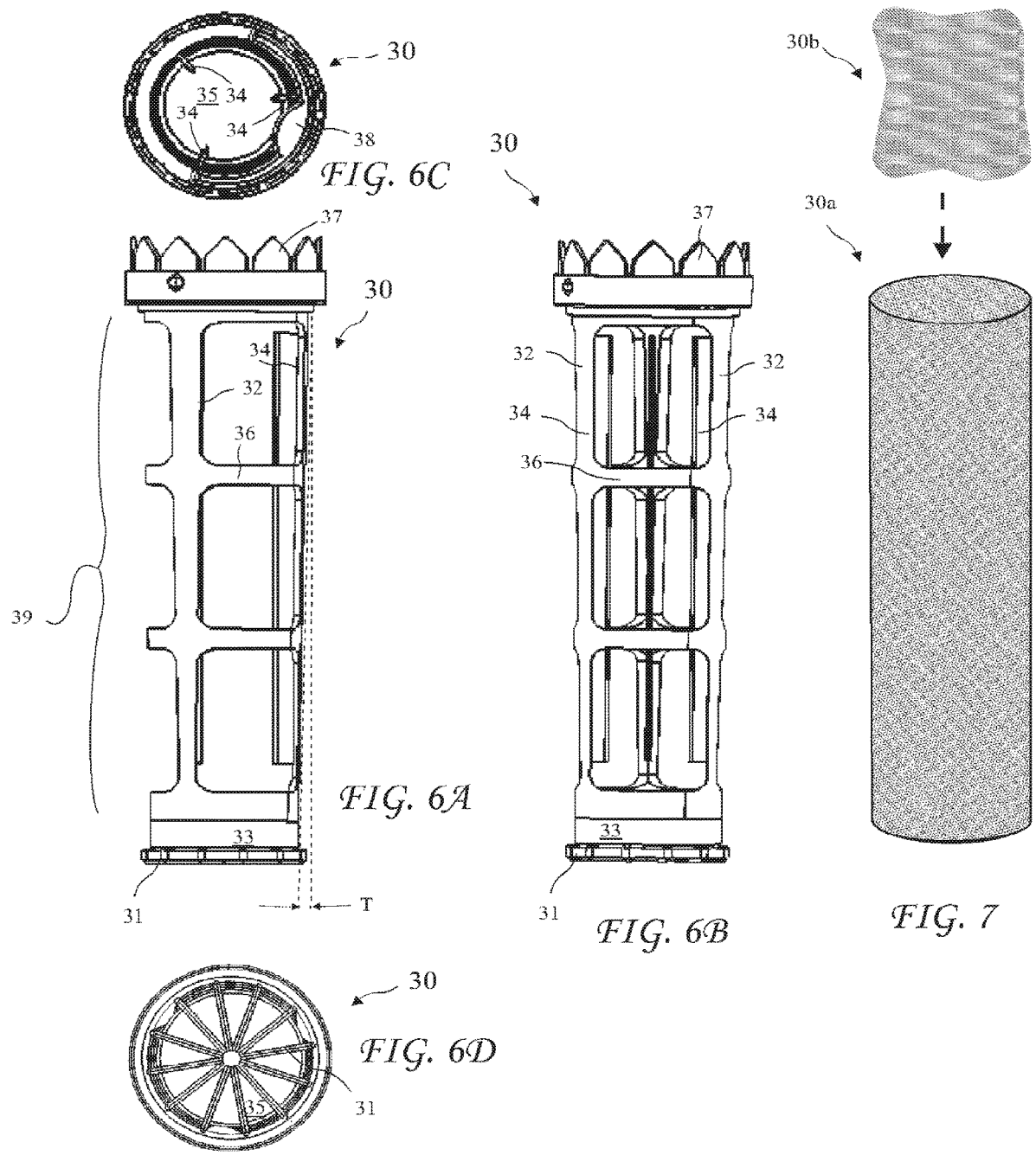

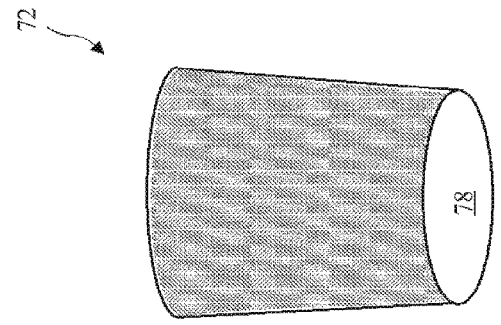
FIG. 14C
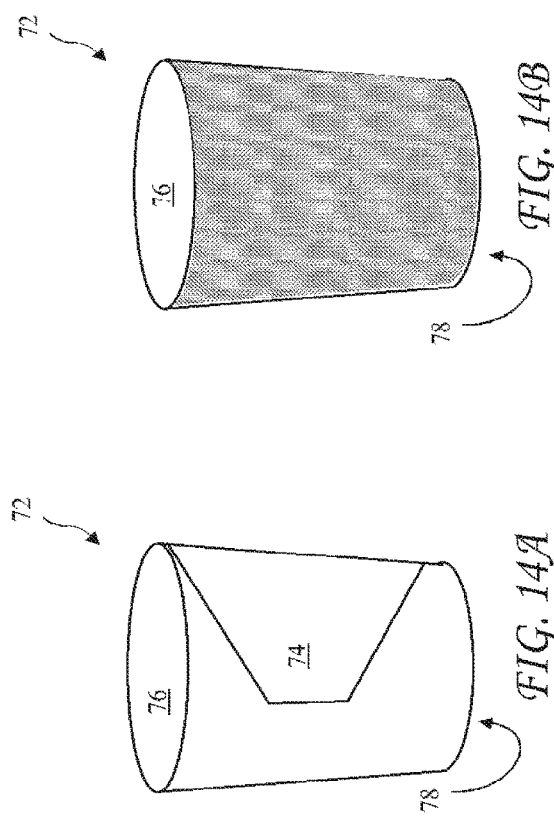
FIG. 14B
FIG. 14A
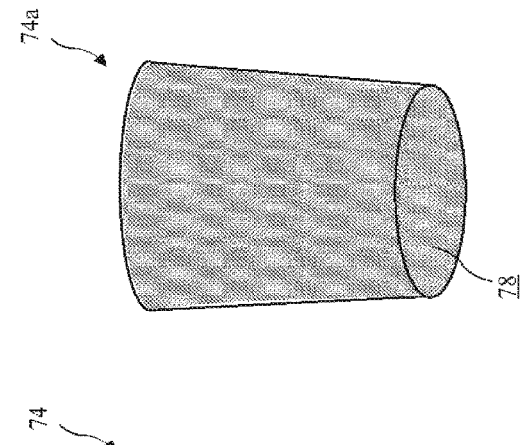
FIG. 15D
FIG. 15C
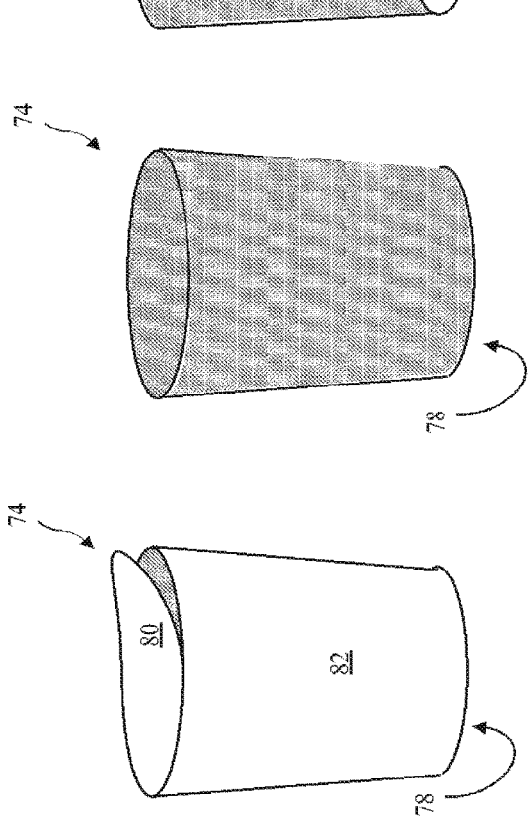
FIG. 15B
FIG. 15A

BEVERAGE BREWING DEVICE

FIELD OF THE INVENTION

The present invention relates to beverage brewing and in particular to a brewing device for hot or cold brewing of beverages.

BACKGROUND OF THE INVENTION

Several types of beverages, such as coffee, tea, and herbal drinks, are brewed by infusing or steeping ground or shredded beverage material in water or other liquid. For quick brewing, hot water is typically used. However, cold brewing, that is, infusion of the beverage material in cold or room-temperature water rather than hot water, is sometimes preferred. For example, some coffee drinkers prefer the flavor provided by cold brewing, and bitterness can be avoided when brewing certain teas by steeping in unheated water rather than hot water. Such cold brewing is provided by submerging a portion of brewing material in unheated water for a period of time to allow the brewing material to infuse the water. While the steeping process may provide a desired result, the time required is longer than that required for brewing in hot water.

Conventional cold-brew steeps require a user to measure and pour a particular amount of brewing material into the steep. A pre-measured simple drop-in portion of brewing material would be convenient, particularly for use in a brewer that simplifies removal of the brewing material and clean-up of the brewer. A brewer that can be used for both hot- and cold-brewing would provide flexibility, and it would be advantageous if the brewer would be configured to speed the cold-brewing process. A further advantage would be provided by a brewer that could replicate the effect of a French press, by adding a compression feature to the brewing process. The ability to use either loose beverage brewing material or pre-packaged brewing material in a capsule or other container would make such a brewer would make such a brewer universally useful.

BRIEF SUMMARY OF THE INVENTION

The present invention addresses the above and other needs by providing a hot/cold beverage brewing device that reduces the time required to cold-brew coffee and other beverages. The brewer includes a container, and an elongated brewing material holder configured to be coupled to a lid of the container such that it is suspended from the lid. The brewing material holder is lined in a mesh material or includes one or more mesh panels to retain brewing material in the brewing material holder. For example, the mesh can be a fine nylon mesh or a 75 micron opening nylon mesh. The lid and/or container includes a mechanism that is configured to rotate the brewing material holder within the container so as to agitate the brewing material in the brewing material holder. To brew a beverage, water or other liquid is added into the container and brewing material is disposed in the brewing material holder, which is submerged in the liquid in the container. Movement of the brewing material submerged in the water substantially reduces the time required for cold brewing. The brewing material added to the holder can be loose material or a prepackaged capsule or other container of brewing material.

According to an aspect of the invention, a beverage brewing device includes a brewing material holder and a drive assembly configured to rotate the brewing material holder about a longitudinal axis of the brewing material holder, either in a continuous rotation or periodically reversing directions in a back-and-forth motion. For example, the drive assembly can be configured to oscillate the brewing material holder at between 30 and 90 cycles per minute and between 90 degrees and 270 degrees of rotation, in order to agitate the brewing material when submerged in water within the container. Motion of the brewing material in the water significantly reduces cold brewing time.

According to another aspect of the invention, a prepackaged capsule of brewing material is configured to couple with the drive mechanism, so that the capsule itself will oscillate with the movement of the mechanism, without the need for the brewing material holder.

The drive mechanism can be of any type known to those of skill in the art. For example, it can be a mechanical drive mechanism that is battery-powered, powered by AC current, or manually powered, such as by turning a crank handle.

According to another aspect of the invention, a method for beverage brewing includes disposing brewing material in a brewing material holder of a beverage brewer, coupling a drive assembly to the brewing material holder, adding water to the interior of a container of the beverage brewer, coupling the brewing material holder to a lid of the container, submerging the brewing material holder in the water, coupling the lid to the opening of the container, and actuating the drive assembly so as to cause motion of the brewing material holder within the container and agitation of the brewing material in the water, thereby brewing the beverage.

According to another aspect of the invention, a beverage brewer includes a brewing material holder and a drive assembly. The brewing material holder is configured to hold beverage brewing material suspended within a container having an open top and configured to hold a liquid. The drive assembly configured to be coupled to the brewing material holder, the drive assembly operable to rotate the brewing material holder.

The beverage brewer can also include the container, and a cap configured to couple with the container at the open top. The cap can be configured to support the brewing material holder such that the brewing material holder is free to rotate within the container when the cap is coupled with the container at the open top.

The brewing material holder can include an open frame having structural members and open areas between the structural members. The open frame can include at least one blade arranged on an interior of corresponding at least one structural member of the open frame. The at least one blade can be configured to engage a beverage capsule to cause the capsule to rotate with the brewing material holder. The drive assembly can include a ramming projection configured to urge the capsule toward the at least one blade. The brewing material holder can include mesh material covering at least one of the open areas of the open frame. The open frame can include fins arranged on an exterior of at least one structural member of the open frame.

The brewing material holder can include first mating elements, the drive assembly ca include second mating elements, and the first mating elements can be configured to couple with the second mating elements such that the drive assembly is operable to cause the brewing material holder to rotate. For example, the first mating elements can be triangular teeth, and the second mating elements can be corresponding protruding bars.

According to another aspect of the invention, a beverage brewer includes a drive assembly configured to be coupled to a beverage capsule, the drive assembly operable to rotate the beverage capsule in a container of liquid to brew a beverage.

The beverage brewer can also include the container, having an open top and configured to hold a liquid. The drive assembly can be configured to couple to the container to suspend the beverage capsule within the container.

The beverage brewer can include the beverage capsule.

The beverage capsule can include first mating elements, the drive assembly can include second mating elements, and the first mating elements can be configured to couple with the second mating elements such that the drive assembly is operable to cause the beverage capsule to rotate. For example, the first mating elements can be triangular teeth, and the second mating elements can be corresponding protruding bars.

BRIEF DESCRIPTION OF THE DRAWINGS

These and other aspects, features, and advantages of the present invention will be more apparent from the following more detailed description thereof, with reference to the following drawings wherein:

FIG. 6A shows a side view of the brewing material holder of the beverage brewing device according to an exemplary embodiment of the present invention.

FIG. 6B shows a second side view of the brewing material holder of the beverage brewing device according to an exemplary embodiment of the present invention.

FIG. 6C shows a top view of the brewing material holder of the beverage brewing device according to an exemplary embodiment of the present invention.

FIG. 6D shows a bottom view of the brewing material holder of the beverage brewing device according to an exemplary embodiment of the present invention.

FIG. 7 shows mesh material used to enclose the brewing material holder according to an exemplary embodiment of the present invention.

FIG. 14A shows a packaged brewing material capsule for use in the beverage brewing device according to an exemplary embodiment of the present invention.

FIG. 14B shows the packaged brewing material capsule for use in the beverage brewing device according to an exemplary embodiment of the present invention with a tear-away strip removed.

FIG. 14C shows a bottom perspective view of the packaged brewing material capsule for use in the beverage brewing device according to an exemplary embodiment of the present invention with a top tear-away strip removed.

FIG. 15A shows a second packaged brewing material capsule for use in the beverage brewing device according to an exemplary embodiment of the present invention.

FIG. 15B shows the second packaged brewing material capsule for use in the beverage brewing device according to an exemplary embodiment of the present invention with a tear-away strip removed.

FIG. 15C shows a bottom perspective view of the second packaged brewing material capsule for use in the beverage brewing device according to an exemplary embodiment of the present invention with a tear-away strip removed.

FIG. 15D shows a bottom perspective view of the second packaged brewing material capsule for use in the beverage brewing device according to an exemplary embodiment of the present invention with a tear-away strip, top, and bottom removed.

Corresponding reference characters indicate corresponding components throughout the several views of the drawings.

DETAILED DESCRIPTION OF THE INVENTION

Figure 1A:
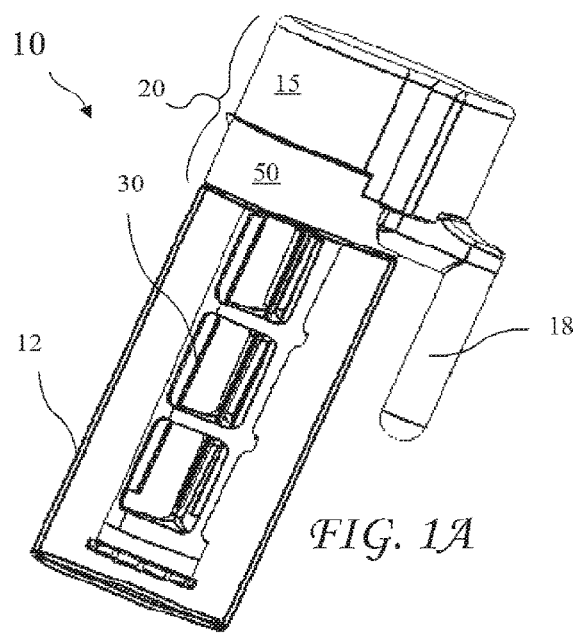
FIG. 1A shows a side view of a beverage brewing device according to an exemplary embodiment of the present invention.
Figure 1B:
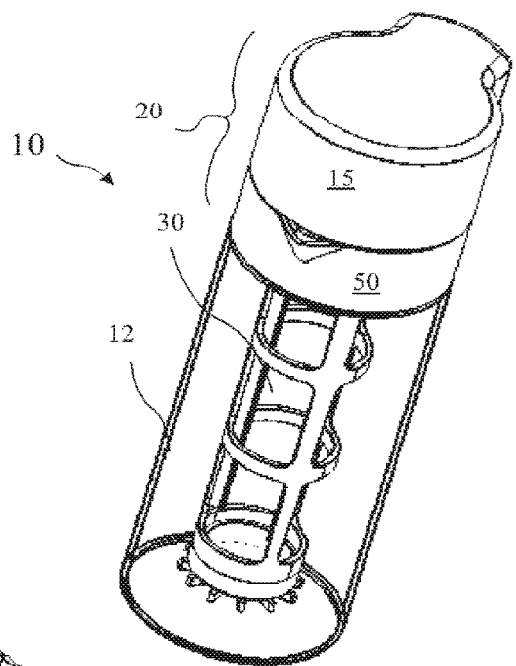
FIG. 1B shows a top and side view of the beverage brewing device according to an exemplary embodiment of the present invention.
Figure 1C:
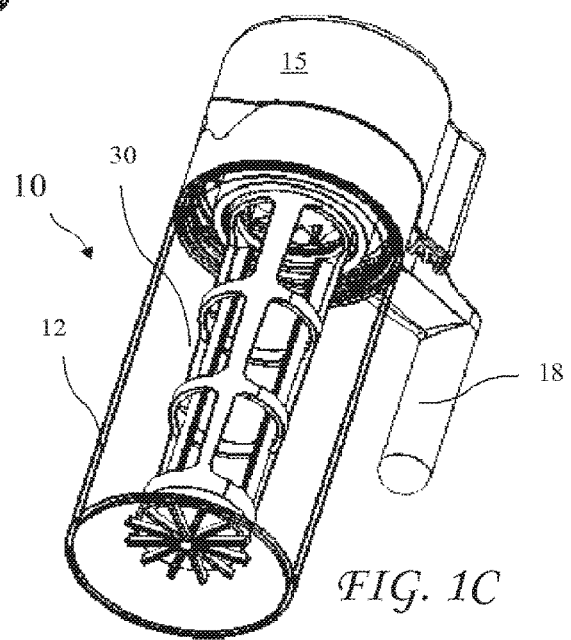
FIG. 1C shows a bottom and side view of the beverage brewing device according to an exemplary embodiment of the present invention.
Figure 3B:
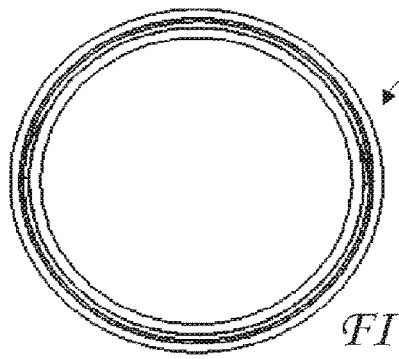
FIG. 3B shows a top view of the liquid container according to an exemplary embodiment of the present invention.
Figure 3A:
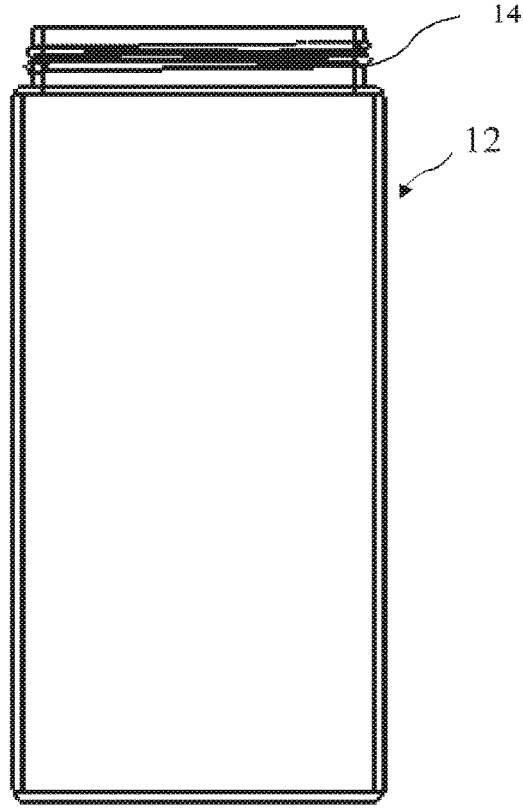
FIG. 3A shows a side view of the liquid container according to an exemplary embodiment of the present invention.
Figure 2:
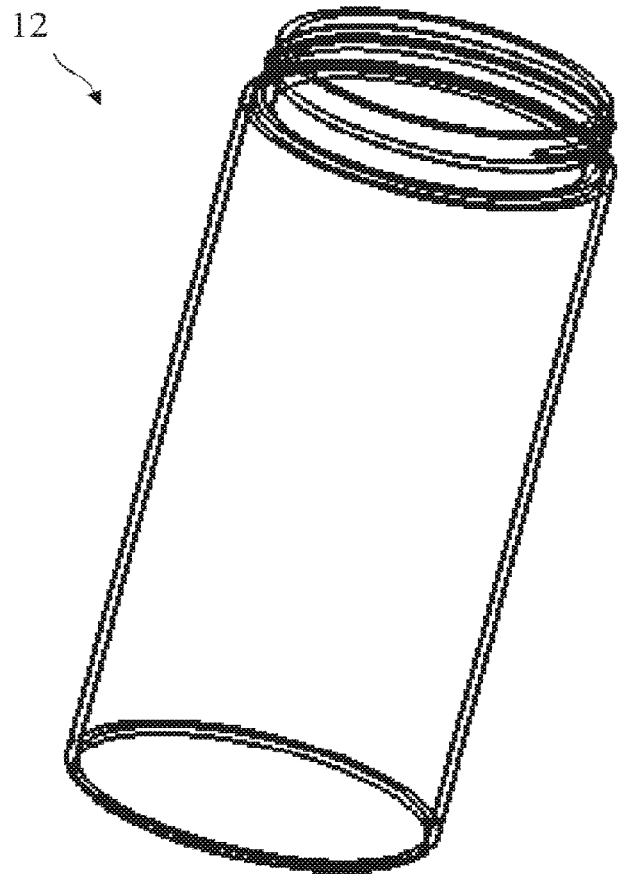
FIG. 2 shows a bottom and side view of a liquid container according to an exemplary embodiment of the present invention.
Figure 3C:
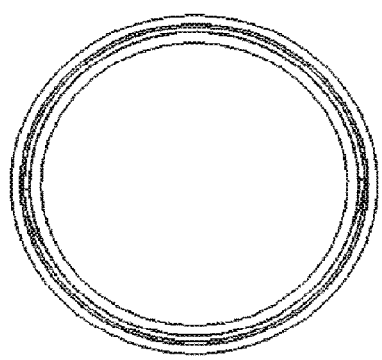
FIG. 3C shows a bottom view of the liquid container according to an exemplary embodiment of the present invention.

Various views of an exemplary beverage brewing device 10 according to the present invention are shown in FIGS. 1A, 1B, and 1C. The beverage brewing device 10 includes a container 12 for holding water during brewing, which has an open mouth for attachment of a container cap 50 of a cover 20. The container 12 can be made of any suitable material, such as plastic or glass, and can be transparent to allow viewing the beverage as it brews, although opaque or translucent materials can be used to form the container 12 as well. According to certain embodiments, a brewing material holder 30 is coupled to and suspended from an inside portion of the cover 20. As shown, the brewing material holder 30 is lined with a mesh material 30a or includes mesh panels (see FIG. 7). A handle 18 is attached to the beverage brewing device 10, for example at the cover 20 as shown.

Referring to FIGS. 2 and 3A-3C, the container 12 includes closed sides or a closed sidewall, a closed bottom, and an open mouth, and can take any suitable shape, such as the generally cylindrical shape shown. The open top of the container 12 is configured to removably couple with the cover 20. For example, as shown, the rim of the mouth of the container can include threads 14 for mating with corresponding threads of the cover 20 for easy coupling. The container 12 and cover 20 can be otherwise configured for coupling such as by press-fit or snap-on couplers or any other configuration known to those skilled in the art.

Figure 4:
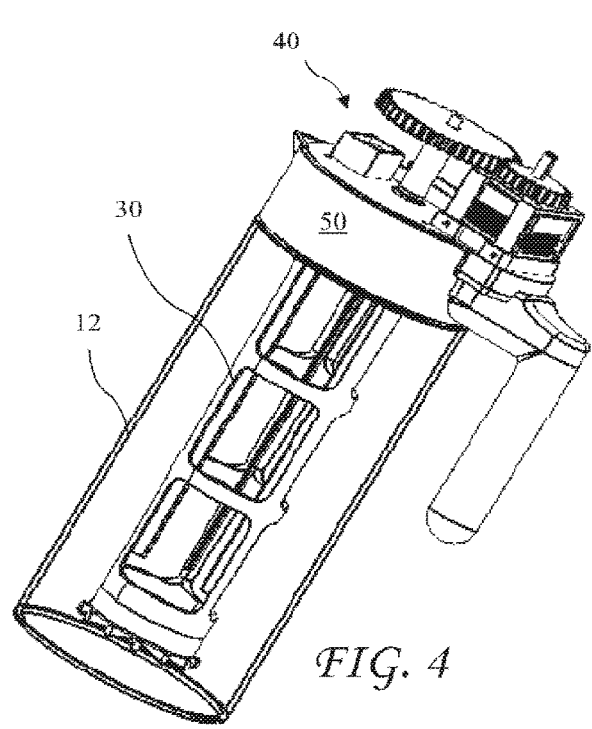
FIG. 4 shows a side view of the beverage brewing device according to an exemplary embodiment of the present invention with a lid removed.

A side view of the beverage brewing device 10 with the lid 15 removed is shown in FIG. 4. A drive assembly 40 is housed under the lid 15 in the cover 20 and is configured to rotate the brewing material holder 30 during the brewing process. The drive assembly 40 shown is just one example of numerous drive assemblies that can be used as a drive element of the present invention. The drive assembly 40 can cause the brewing material holder 30 to rotate about a fixed axis, such as an axis parallel to the longitudinal axis of the brewing material holder to provide smooth rotation, or at an angle to the longitudinal axis so as to provide a more eccentric and therefore turbulent motion. The drive assembly 40 can also or otherwise be configured to provide a shaking or jittering motion to the brewing material holder 30. In summary, the drive assembly 40 is configured to provide any motion to the brewing material holder 30 that would cause advantageous agitation of brewing material held within the brewing material holder 30. The drive assembly can be powered by any known source, such as for example by direct current provided by batteries or a solar panel, alternating current provided via a plug configured to engage a wall socket, a spring-biased winding force, or by simple manual manipulation of a crank handle or other implement for turning the drive assembly 40. The lid 15 is removable for maintenance and repair of the drive assembly 40.

Figure 5A:
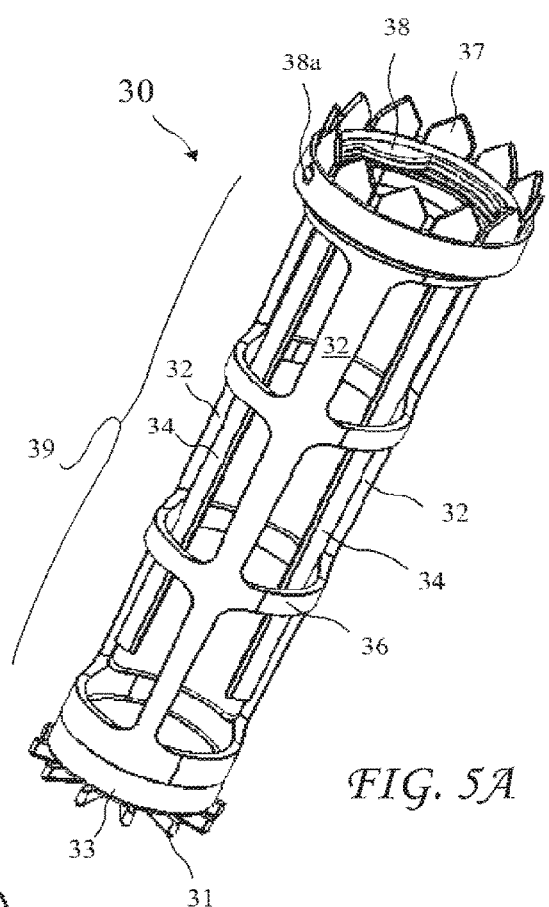
FIG. 5A shows a top and side view of a brewing material holder of the beverage brewing device according to an exemplary embodiment of the present invention.
Figure 5B:
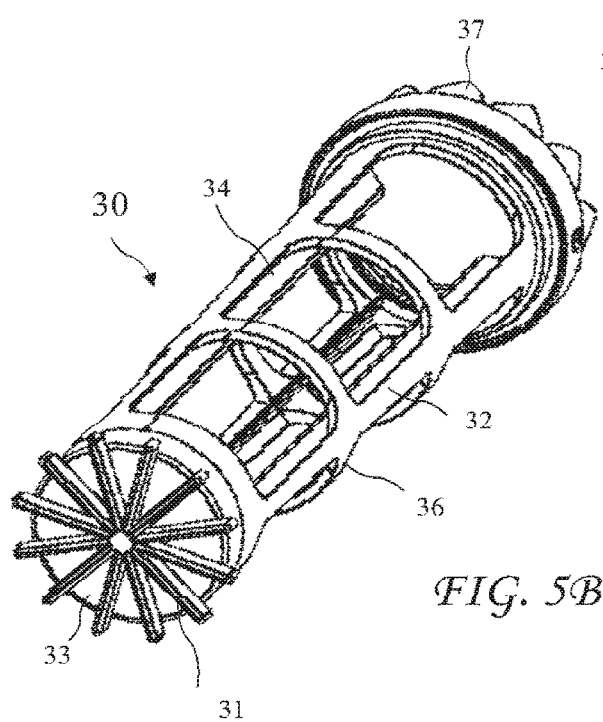
FIG. 5B shows a bottom and side view of the brewing material holder of the beverage brewing device according to an exemplary embodiment of the present invention.

With reference to FIGS. 5A and 5B, the brewing material holder 30 includes a frame 39 to provide a base for mesh material. The frame 39 supports the brewing material while the mesh material allows water to pass through and around the brewing material in order to brew a beverage. The frame 39 also adds structural support for movement of the brewing material holder 30 by the drive assembly 40. For example, (see FIG. 6A) the frame 39 can include longitudinal members 32 and circular cross members 36, although any suitable structural configuration is contemplated for use as the frame 39. The frame can also include blades 34, in the sense of paddle blades, arranged on the interior portion of the frame 39, preferably within the mesh material, configured to urge brewing material within the brewing material holder to move with rotation of the brewing material holder 30. The frame 39 includes a bottom end 33 that can be integrally formed with the rest of the frame 39 or can be removably attached at the bottom of the frame 39, for example attached via a threaded interface. Fins 31 can be included on the outside of the bottom end 33 to encourage mixing of the liquid in the container 12 as brewing progresses. The bottom end 33 can be a solid bottom plate or can include mesh inserts, and in any case supports and contains the brewing material inside the brewing material holder 30. The brewing material holder 30 can include at least one holder handle 38 to facilitate lifting of the brewing material holder 30 from the container 12. The holder handle 38 can be fixed or, for example, pivotally attached at the top of the brewing material holder 30 by pivots.

Figure 8A:
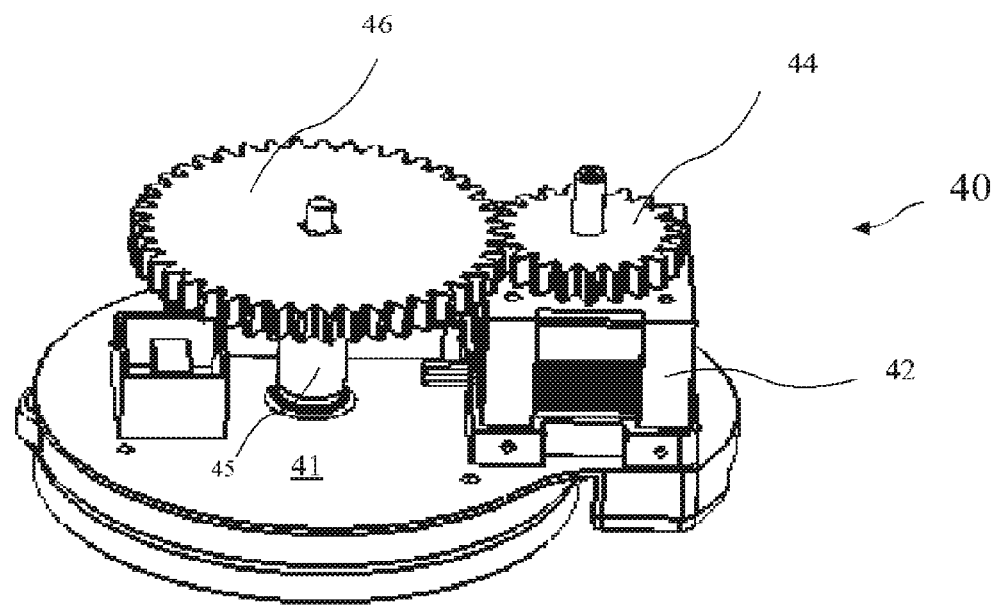
FIG. 8A shows a top and side view of a drive assembly according to an exemplary embodiment of the present invention.
Figure 8B:
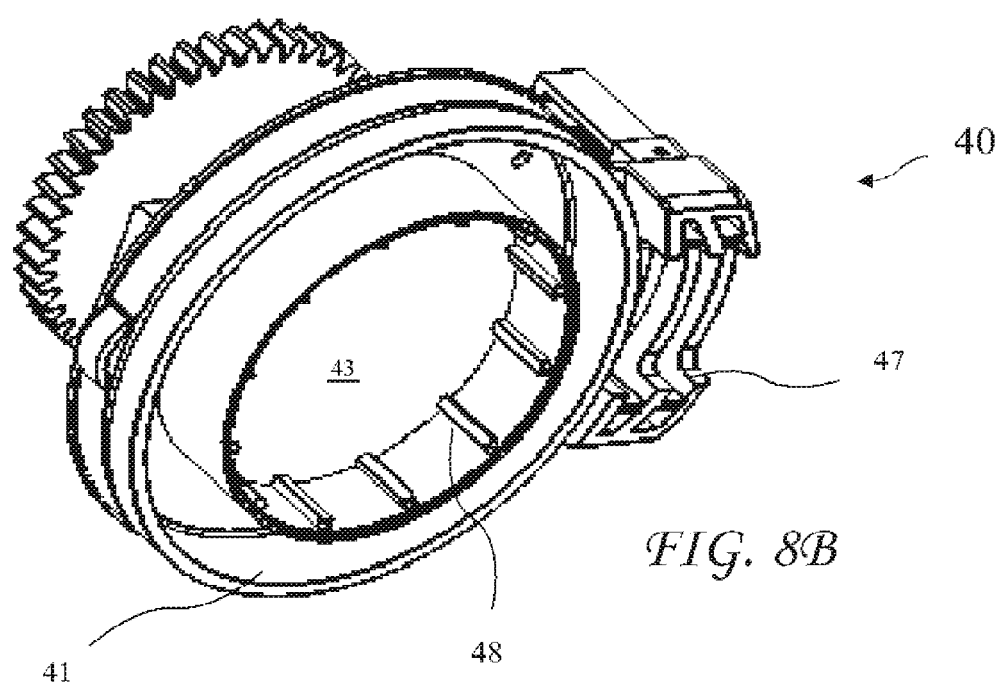
FIG. 8B shows a bottom and front view of the drive assembly according to an exemplary embodiment of the present invention.

The brewing material holder 30 can engage with the drive assembly 40 in any of a number of ways. For example, referring to FIGS. 6A, 6B, 6C, and 6D, triangular-ended teeth 37 can be disposed at the top of the brewing material holder 30, pointing outward from the brewing material holder 30 and configured to engage protruding bars 48 (see FIG. 8B) of the drive assembly 40 to couple the brewing material holder 30 to the drive assembly 40 such that rotation of the protruding bars 48 by the drive assembly 40 causes corresponding rotation of the brewing material holder 30, which in turn causes agitation of the brewing material in the water. This coupling arrangement is shown as an example only, and any coupling arrangement apparent to those of skill in the art can be used within the contemplated scope of the invention.

With reference to FIG. 7, a mesh panel or sleeve 30a is attached to the frame 39 of the brewing material holder 30 so as to cover open areas in the frame 39 to contain the brewing material 30b within the brewing material holder 30. A single mesh sleeve 30a as shown can be used, or individual mesh panels can be attached to the frame 39 to cover the open areas. The fabric of the mesh need only be fine enough to keep the beverage material contained within the brewing material holder, but should not be so fine as to overly restrict the flow of water through the beverage material during the brewing process. Examples of suitable mesh materials are fine nylon mesh, 75 micron opening nylon mesh, metal mesh material, and paper mesh material (for example, filter paper). Those skilled in the art will recognize that other mesh material may be used, and it is contemplated that a brewing material holder including such other mesh material could be used within the scope of the present invention.

Figure 9A:
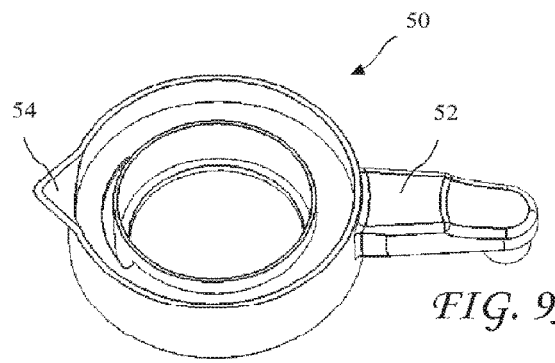
FIG. 9A shows a top and side view of a container cap according to an exemplary embodiment of the present invention.
Figure 9B:
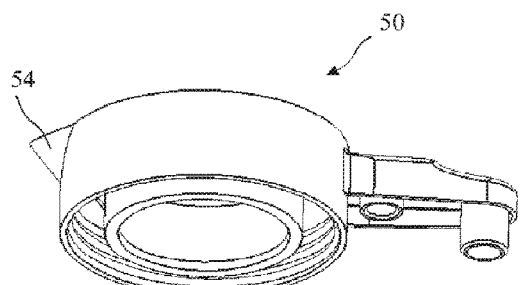
FIG. 9B shows a bottom and side view of the container cap according to an exemplary embodiment of the present invention.
Figure 9C:
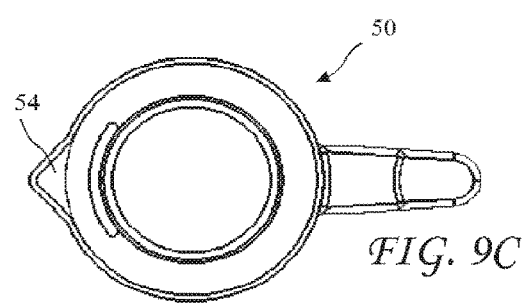
FIG. 9C shows a top plan view of the container cap according to an exemplary embodiment of the present invention.
Figure 10:
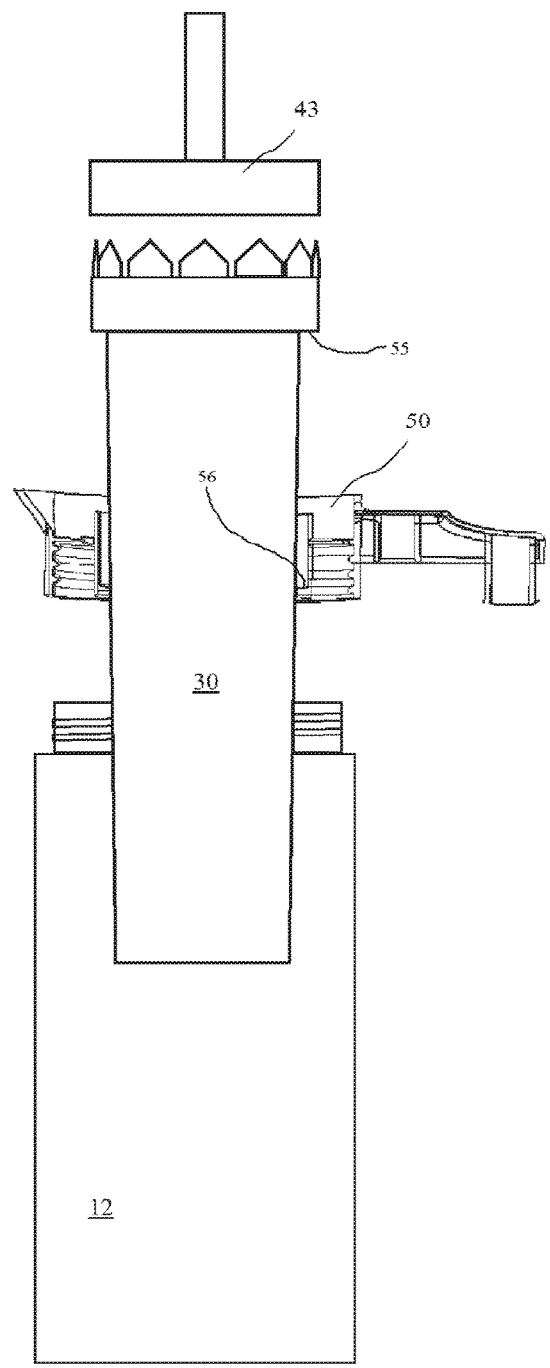
FIG. 10 shows an exploded view of the container, container cap, brewing material holder, and coupler of the beverage brewing device according to an exemplary embodiment of the present invention.

So that the brewing material holder can be rotated or otherwise oscillated within the container 12 during the brewing process, the drive assembly 40 is configured to be coupled to the brewing material holder 30 and to the container cap 50, which in turn is configured to be coupled to the container 12. For example, with reference to FIGS. 8A and 8B, the drive assembly 40 can be disposed on top of the container cap 50. In this exemplary embodiment, lips 47 of the drive assembly 40 straddle a handle support 52 of the container cap 50 (see FIG. 9A) to seat the drive assembly 40 on the container cap 50 and fix the position of the drive assembly 40. Rotational motion can be provided by an electric motor 42 through reduction gears 44 and 46. The drive assembly 40 includes a drive coupler 45 rotationally coupling the gear 46 to the protruding bars 48 positioned to engage the triangular teeth 37 (see FIGS. 6A, 6B) of the brewing material holder 30 to functionally couple the brewing material holder 30 to the drive assembly 40. The brewing material holder 30 can be structurally coupled to the cover 20, such as to the cap 50 or directly to the drive mechanism 40, by any known mating structure, such as a press-fit coupling arrangement or a threaded outer sleeve. For example, a protruding ball 38a at the top of the holder 30 can mate with a corresponding depression on the inner surface of the cap 50 to lock the holder 30 in place.

The reduction gears 44 and 46 have a ratio selected to provide the desired rotational speed of the brewing material holder 30 with respect to the rotational speed at the electric motor 42. Any suitable rotational speed or pattern of motion can be imparted by selection of the motor and gearing. For example, the rotational motion can be an oscillation of between 90 degrees and 270 degrees, at a cycle of between 30 cycles per minute and 90 cycles per minute, or it can be a continuous rotation in a single direction at any suitable rotational speed. The rotation can be made eccentric rather than smooth through the use of a cam or other non-circular gearing and the motor can be made to jitter the motion if desired. Further, the exemplary gearing is only one of many ways of translating the motor output to the drive coupler, and it is contemplated that any such mechanical translation can be substituted for the gearing arrangement within the scope of the invention.

With reference to FIGS. 9A, 9B, 9C, and 10, the container cap 50 engages the container 12 during the brewing process. The brewing material holder 30 slides down through the container cap 50 into the container 12 and is supported by the container cap 50, for example, as shown by having an overhanging portion 55 at the top end of the brewing material holder 30 rest on a corresponding protruding lip 56 on the interior of the container cap 50. The coupler 43 engages the brewing material holder 30 when the drive assembly 40 is placed onto the container cap 50 to rotate the brewing material holder 30 during the brewing process. Thus, according to this arrangement, the holder 30 rotates freely on the lip 56 when the drive coupler 45 rotates. However, it is contemplated that any arrangement that allows for rotation of the holder 30 while it is supported by other elements of the beverage brewing device 10 is included within the scope of the invention. A spout 54 can be provided to facilitate pouring brewed drink from the beverage brewing device 10.

Figure 11A:
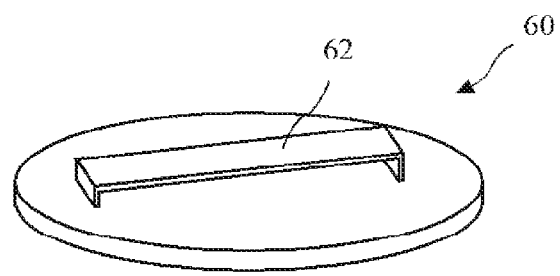
FIG. 11A shows a top view of a pouring lid of the beverage brewing device according to an exemplary embodiment of the present invention.
Figure 11B:
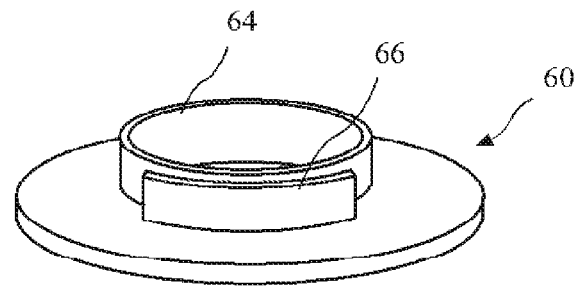
FIG. 11B shows a bottom view of the pouring lid of the beverage brewing device according to an exemplary embodiment of the present invention.

With reference to FIGS. 11A and 11B, a pouring lid 60 is provided that can replace the drive assembly 40 after brewing the brewed beverage. A lid handle 62 is provided that allows a user to remove the pouring lid 60. The pouring lid 60 can be rotated to align and separate a spout guard 66 from the spout 54 (see FIGS. 9A-9C).

Figure 12:
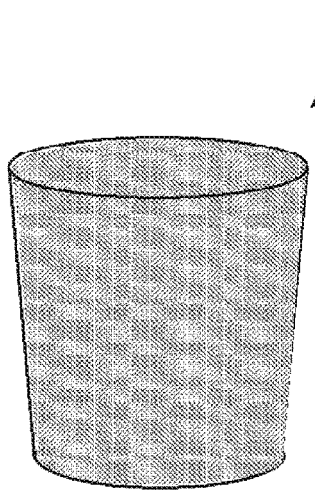
FIG. 12 shows brewing material capsule for use in the beverage brewing device according to an exemplary embodiment of the present invention.

An exemplary brewing material capsule 70 for use in the beverage brewing device 10 is shown schematically in FIG. 12. The brewing material capsule 70 has an outer shell made of water-permeable material, for example, fine nylon mesh, 75 micron opening nylon mesh, metal mesh material, paper mesh material (for example, filter paper), and encloses and contains a quantity of brewing material 30b measured for one or more servings of brewed beverage. The mesh sleeve 30a described above for use with an exemplary embodiment is not required when using the capsule 70, so long as openings in the frame 39 of the holder 30 are not large enough to allow the capsule 70 to pass through the frame 39. The brewing material capsule 70 is preferably deformable, and when inserted into the brewing material holder 30, deforms to engage the blades 34 (see FIGS. 5A, 5B) inside of the brewing material holder 30, to cause the capsule 70 to rotate with the brewing material holder 30 to accelerate brewing. If not deformable, the capsule 70 can be inserted into the brewing material holder 30 with sufficient force to provide a friction fit between the capsule 70 and the blades 34 to cause the capsule 70 to rotate with the brewing material holder 30 to accelerate brewing. Thus, the brewing material holder 30 is configured such that a user can simply drop a conventional pre-packaged capsule 70 of beverage material into the brewing material holder 30 to brew the beverage. A brewing material holder 30 that includes the mesh sleeve 30a provides flexibility in that loose beverage material or a beverage capsule 70 can be used advantageously with the beverage brewing device of the invention for hot beverage brewing or accelerated cold beverage brewing.

Figure 13A:
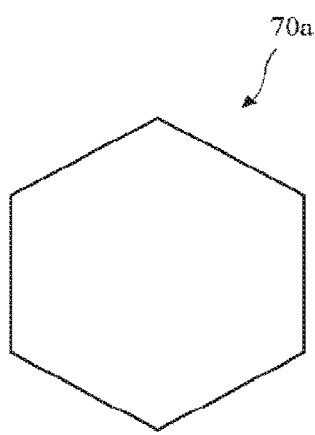
FIG. 13A shows a top view of a polygonal blade-engaging capsule for use in the beverage brewing device according to an exemplary embodiment of the present invention.
Figure 13B:
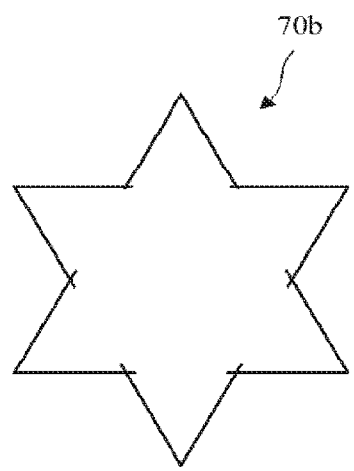
FIG. 13B shows a top view of a star blade-engaging capsule for use in the beverage brewing device according to an exemplary embodiment of the present invention.

Although any conventional beverage capsule can be used advantageously with the beverage brewing device of the invention, particularly-shaped capsules can be provided for use with the device. For example, a polygonal blade-engaging capsule 70a as shown in FIG. 13a and a star-shaped blade-engaging capsule 70b as shown in FIG. 13B are shaped to engage the blades 34 without deforming the capsule 70a or 70b or requiring a friction fit between the capsule 70a or 70b and the blades 34. The capsule may further include grooves in walls of the capsule angularly spaced apart to engage the blades 34.

Referring to FIGS. 14A, 14B, and 14C, a packaged brewing material capsule 72 for use in the beverage brewing device 10 can be enclosed in packaging for transport and storage that is preferably not water permeable, so as to prevent moisture from contacting the brewing material before brewing, and to retain coffee aromatics and particulate matter to preserve flavor, Preferably, the packaged brewing material capsule 72 includes a tear-away wall strip 74 to facilitate removal of the packaging. According to certain embodiments, the packaging top 76 and bottom 78 can remain when the tear-away strip 74 is removed, allowing water to flow through the sidewalls of the capsule 72. The packaging is preferably removed before the capsule is disposed within the brewing material holder 30 for brewing.

With reference to FIGS. 15A-15D, an alternative packaged brewing material capsule 74 for use in the beverage brewing device 10 includes a top tear-away wall strip 80, which can be removed as shown in FIG. 15B to facilitate removal of a wall 82 of the packaging. According to certain embodiments, the packaging bottom 78 can remain when the tear-away strip 80 and wall 82 are removed.

Figure 16A:
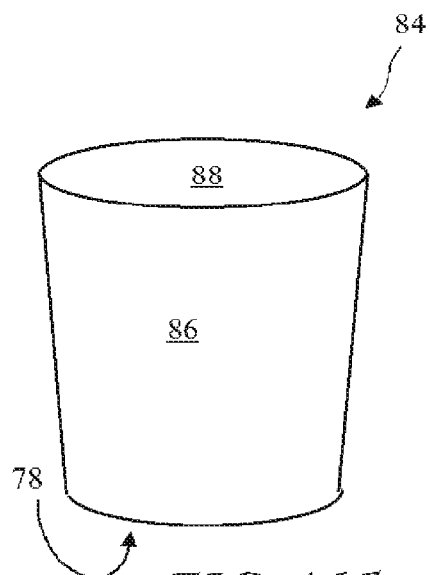
FIG. 16A shows a third packaged brewing material capsule for use in the beverage brewing device according to an exemplary embodiment of the present invention.
Figure 16B:
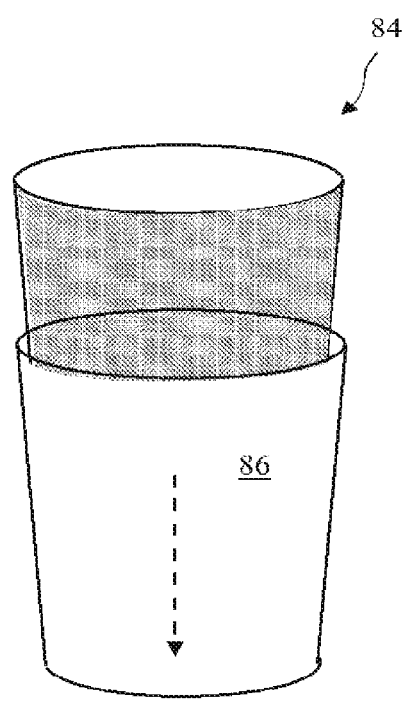
FIG. 16B shows the third packaged brewing material capsule for use in the beverage brewing device according to an exemplary embodiment of the present invention with the brewing material in a water-permeable package separated from packaging material.

FIG. 16A shows another packaged brewing material capsule 84 for use in the beverage brewing device 10 and FIG. 16B shows this packaged brewing material capsule 84 with the brewing material in the water-permeable package 88 separated from the packaging material 86. After separating, the brewing material in the water-permeable package 88 can be inserted into the beverage brewing device 10 for brewing.

Figure 16C:
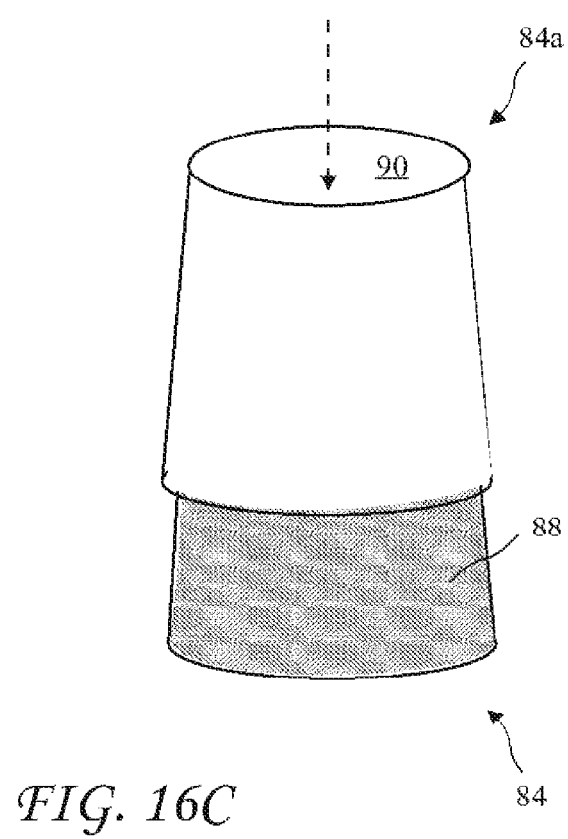
FIG. 16C shows the brewing material in a water-permeable package pressed out of an open bottom protective package according to an exemplary embodiment of the present invention.

FIG. 16C shows the brewing material in a water-permeable package pressed out of an open bottom protective package 84a after removing a bottom cover of the open bottom protective package 84a. The bottom is configured to break away from the walls, and to be pressed against the brewing material in the water-permeable package 88 to press the brewing material in a water-permeable package 88 out of the protective package 84a.

Figure 17:
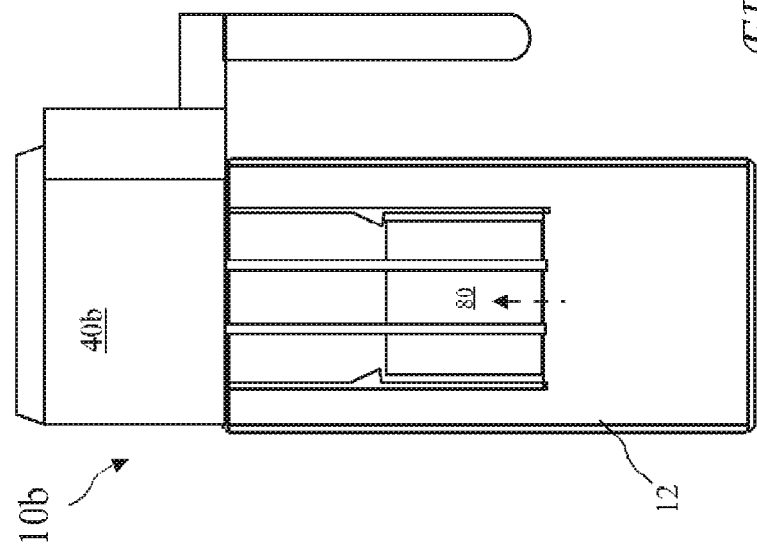
FIG. 17 shows a beverage brewing device pressing the brewing material in a water-permeable package down and out of the open bottom protective package according to an exemplary embodiment of the present invention.

FIG. 17 shows an exemplary embodiment of a beverage brewing device 10a pressing the brewing material in the water-permeable package down and out of the open bottom protective package. The beverage brewing device 10a includes stops 92 in a brewing material holder 30' and a drive assembly 40a includes a ramming projection 94 that pushes the brewing material in the water-permeable package 88 out of the protective packaging and into the brewing material holder 30' to be rotated or oscillated by the drive assembly 40b to make a brewed beverage. The effect is similar to that of a French press brewer in which water is forced through compressed, coarsely-ground brewing material.

Figure 18:
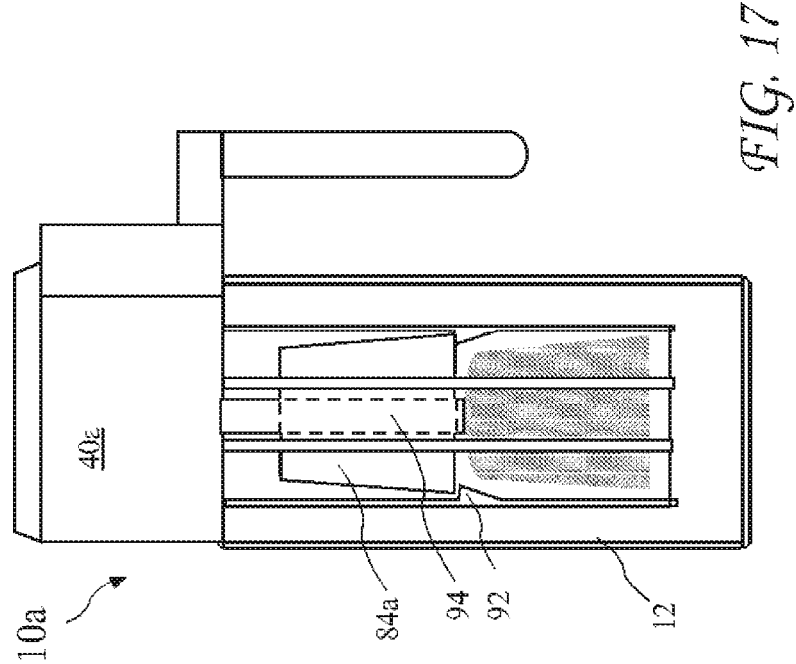
FIG. 18 shows a side view of a beverage brewing device having a brewing material capsule carried by a drive assembly according to an exemplary embodiment of the present invention.

FIG. 18 shows a side view of an exemplary embodiment of a brewing device 10b having a brewing material capsule 80 carried by a drive assembly 40a. The brewing material capsule 80, after packaging material is removed from walls of the brewing material capsule 80, is inserted into a cage 82 and rotated or oscillated by the drive assembly 40b to make a brewed beverage.

Figure 19A:
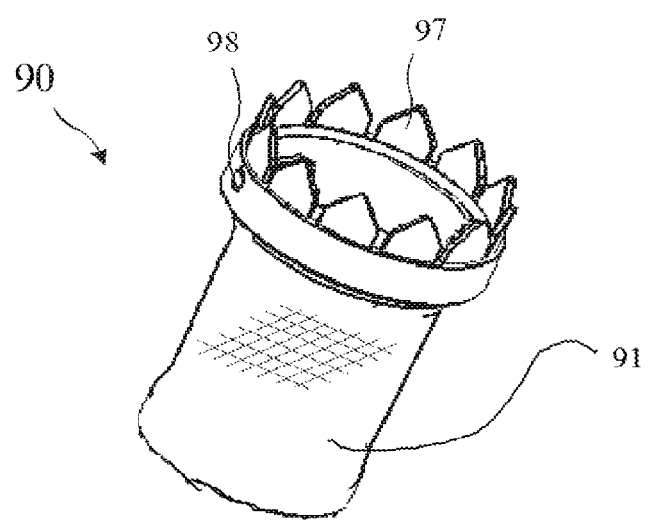
FIG. 19A shows an exemplary brewing material capsule for use with a beverage brewing device according to the invention.

With reference to FIG. 19A, according to another aspect of the invention, a brewing material capsule 90 is provided that is configured to couple to and engage with the drive assembly directly, obviating the need for a brewing material holder 30. For example, the capsule 90, which is prepackaged to contain a measured amount of brewing material within a water-permeable package 91, can be configured with triangular-ended teeth 97 disposed at the top of the capsule 90, pointing outward from the capsule 90 and configured to engage the protruding bars 48 (see FIG. 8B) of the drive assembly 40 to couple the capsule 90 to the drive assembly 40 such that rotation of the protruding bars 48 by the drive assembly 40 causes corresponding rotation of the capsule 90, which in turn causes agitation of the brewing material in the water. This coupling arrangement is shown as an example only, and any coupling arrangement apparent to those of skill in the art can be used within the contemplated scope of the invention.

Figure 19B:
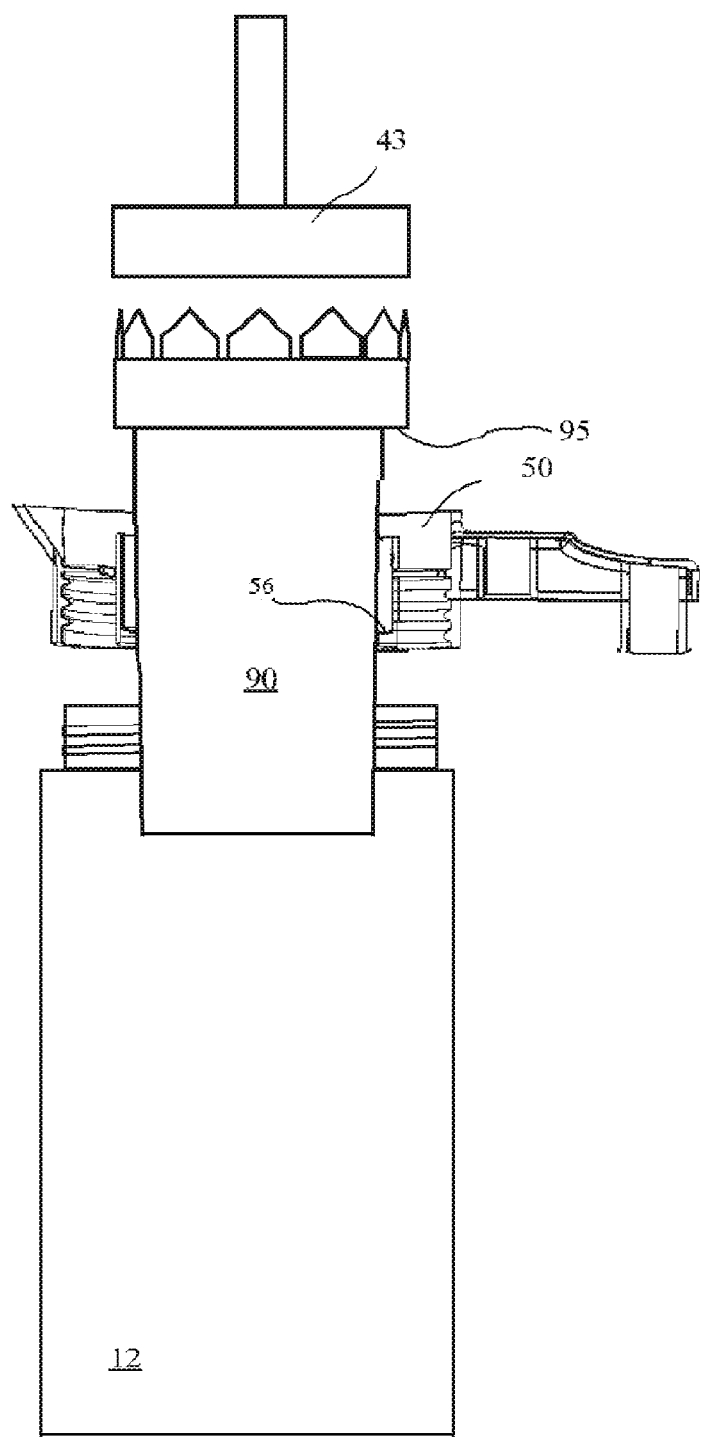
FIG. 19B shows an exemplary beverage brewing device according to the invention for use with a brewing material capsule.

With reference to FIG. 19B, the container cap 50 engages the container 12 during the brewing process. The capsule 90 slides down through the container cap 50 into the container 12 and is supported by the container cap 50, for example, as shown by having an overhanging portion 95 at the top end of the capsule 90 rest on a corresponding protruding lip 56 on the interior of the container cap 50. The coupler 43 engages the capsule 90 when the drive assembly 40 is placed onto the container cap 50 to rotate the capsule 90 during the brewing process. Thus, according to this arrangement, the capsule 90 rotates freely on the lip 56 when the drive coupler 45 rotates. The capsule 90 can be otherwise structurally coupled to the cover 20, such as to the cap 50 or directly to the drive mechanism 40, by any known mating structure, such as a press-fit coupling arrangement, a friction-fit arrangement, a snap-fit mating arrangement, or a threaded outer sleeve. For example, a protruding ball 98 at the top of the capsule 90 can mate with a corresponding depression on the inner surface of the cap 50 to lock the capsule 90 in place. In any case, the capsule 90 couples with and is suspended from the cover 20 of the brewing device 10 without the need for a brewing material holder, simplifying the brewing process. The capsule 90 is also rotationally coupled to the drive assembly 40 so that it can be rotated to expedite the brewing process.

Thus, the brewing device of the present invention can be used for both hot- and cold-brewing, and is configured to speed the cold-brewing process. The brewer has the ability to use either loose beverage brewing material or a simple drop-in portion of pre-packaged brewing material provided in a capsule or other container. Particular embodiments of the brewer replicate the effect of a French press, by adding a compression feature to the brewing process. Use of the brewer of the invention is flexible and convenient, and simplifies removal of the brewing material and clean-up of the brewer.

The present invention has been described by way of example and in terms of preferred embodiments. However, the present invention as contemplated by the inventor is not strictly limited to the particularly disclosed embodiments. To the contrary, various modifications, as well as similar arrangements, are included within the spirit and scope of the present invention. The scope of the appended claims, therefore, should be accorded the broadest reasonable interpretation so as to encompass all such modifications and similar arrangements.

I claim:

1. A beverage brewer, comprising:
 a brewing material holder configured to hold beverage brewing material suspended within a container having an open top and configured to hold a liquid; and
 a drive assembly configured to be coupled to the brewing material holder, the drive assembly operable to rotate the brewing material holder;
 wherein the brewing material holder includes an open frame having structural members and open areas between the structural members; and
 wherein the open frame includes at least one blade arranged on an interior of a corresponding at least one structural member of the open frame.

2. The beverage brewer of claim 1, further comprising the container.

3. The beverage brewer of claim 2, further comprising a cap configured to couple with the container at the open top.

4. The beverage brewer of claim 3, wherein the cap is configured to support the brewing material holder such that the brewing material holder is free to rotate within the container when the cap is coupled with the container at the open top.

5. The beverage brewer of claim 1, wherein the at least one blade is configured to engage a beverage capsule to cause the capsule to rotate with the brewing material holder.

6. The beverage brewer of claim 5, wherein the drive assembly includes a ramming projection configured to urge the capsule toward the at least one blade.

7. The beverage brewer of claim 1, wherein the brewing material holder includes mesh material covering at least one of the open areas of the open frame.

8. The beverage brewer of claim 1, wherein the open frame includes fins arranged on an exterior of at least one structural member of the open frame.

9. The beverage brewer of claim 1, wherein:
the brewing material holder includes first mating elements;
the drive assembly includes second mating elements; and
the first mating elements are configured to couple with the second mating elements such that the drive assembly is operable to cause the brewing material holder to rotate.

10. The beverage brewer of claim 9, wherein the first mating elements are triangular teeth, and the second mating elements are corresponding protruding bars.

11. A beverage brewer, comprising:
a brewing material holder configured to hold beverage brewing material suspended within a container having an open top and configured to hold a liquid; and
a drive assembly configured to be coupled to the brewing material holder, the drive assembly operable to rotate the brewing material holder;
wherein the brewing material holder includes an open frame having structural members and open areas between the structural members; and
wherein the open frame includes fins arranged on an exterior of at least one structural member of the open frame.

12. The beverage brewer of claim 11, further comprising the container.

13. The beverage brewer of claim 12, further comprising a cap configured to couple with the container at the open top.

14. The beverage brewer of claim 13, wherein the cap is configured to support the brewing material holder such that the brewing material holder is free to rotate within the container when the cap is coupled with the container at the open top.

15. The beverage brewer of claim 11, wherein the open frame includes at least one blade arranged on an interior of a corresponding at least one structural member of the open frame.

16. The beverage brewer of claim 15, wherein the at least one blade is configured to engage a beverage capsule to cause the capsule to rotate with the brewing material holder.

17. The beverage brewer of claim 16, wherein the drive assembly includes a ramming projection configured to urge the capsule toward the at least one blade.

18. The beverage brewer of claim 11, wherein the brewing material holder includes mesh material covering at least one of the open areas of the open frame.

19. The beverage brewer of claim 11, wherein:
the brewing material holder includes first mating elements;
the drive assembly includes second mating elements; and
the first mating elements are configured to couple with the second mating elements such that the drive assembly is operable to cause the brewing material holder to rotate.

20. The beverage brewer of claim 19, wherein the first mating elements are triangular teeth, and the second mating elements are corresponding protruding bars.

21. A beverage brewer, comprising:
a brewing material holder configured to hold beverage brewing material suspended within a container having an open top and configured to hold a liquid; and
a drive assembly configured to be coupled to the brewing material holder, the drive assembly operable to rotate the brewing material holder;
wherein the brewing material holder includes first mating elements;
wherein the drive assembly includes second mating elements;
wherein the first mating elements are configured to couple with the second mating elements such that the drive assembly is operable to cause the brewing material holder to rotate; and
wherein the first mating elements are triangular teeth, and the second mating elements are corresponding protruding bars.

22. The beverage brewer of claim 21, further comprising the container.

23. The beverage brewer of claim 22, further comprising a cap configured to couple with the container at the open top.

24. The beverage brewer of claim 23, wherein the cap is configured to support the brewing material holder such that the brewing material holder is free to rotate within the container when the cap is coupled with the container at the open top.

25. The beverage brewer of claim 21, wherein the brewing material holder includes an open frame having structural members and open areas between the structural members.

26. The beverage brewer of claim 25, wherein the open frame includes at least one blade arranged on an interior of a corresponding at least one structural member of the open frame.

27. The beverage brewer of claim 26, wherein the at least one blade is configured to engage a beverage capsule to cause the capsule to rotate with the brewing material holder.

28. The beverage brewer of claim 27, wherein the drive assembly includes a ramming projection configured to urge the capsule toward the at least one blade.

29. The beverage brewer of claim 21, wherein the brewing material holder includes mesh material covering at least one of the open areas of the open frame.

30. The beverage brewer of claim 21, wherein the open frame includes fins arranged on an exterior of at least one structural member of the open frame.

* * * * *